US005533131A

United States Patent [19]

Kury

[11] Patent Number: 5,533,131

[45] Date of Patent: Jul. 2, 1996

[54] ANTI-EAVESDROPPING DEVICE

[76] Inventor: C. A. Kury, P.O. Box W, Teaticket, Mass., 02536

[21] Appl. No.: 247,293

[22] Filed: May 23, 1994

[51] Int. Cl.[6] .......... H04B 3/00

[52] U.S. Cl. .......... 381/77; 381/183; 381/169; 181/20

[58] Field of Search .......... 381/183, 169, 381/77; 181/20, 22

[56] References Cited

U.S. PATENT DOCUMENTS

| | | | |
|---|---|---|---|
| 1,656,914 | 1/1928 | Hart | 181/20 |
| 3,586,977 | 6/1971 | Lustig | 381/169 |
| 4,072,831 | 2/1978 | Joscelyn | 381/169 |
| 5,420,935 | 5/1995 | Shinohara | 381/183 |

*Primary Examiner*—Curtis Kuntz
*Assistant Examiner*—Minsun Oh
*Attorney, Agent, or Firm*—Michael I. Kroll

[57] ABSTRACT

An anti-eavesdropping device is provided which consists of a first structure for containing sound waves produced by a first person. This first structure includes a sound attenuating breathing device. This first structure includes a first mechanism for converting sound waves into electric waves, which are then transferred to a second structure which is for forming an acoustic seal about the ears of a second person. This second structure includes a second mechanism for converting the electric waves back to the sound waves. Because the device enables two or more people to engage in conversation, in such a way that no sound can escape into the environment to be detected in any way, by the human ear or by any kind of eavesdropping device utilizing direct or indirect interception of sound waves (such as microphones or vibration—detection equipment utilizing laser beams), the device can be used to produce confidential communications in the presence of eavesdroppers and eavesdropping equipment.

7 Claims, 2 Drawing Sheets

ANTI-EAVESDROPPING DEVICE

BACKGROUND OF THE INVENTION

1. Field of the Invention

This invention relates generally to anti-eavesdropping equipment and communication equipment, specifically it relates to an anti-eavesdropping device.

3. Discussion of the Prior Art

Prior art communication devices, such as telephone, radio, television and similar apparatuses have not solved the problems of industrial, political and military eavesdropping. Prior art anti-eavesdropping devices have been capable only of detecting the presence and location of some types of eavesdropping equipment.

SUMMARY OF THE INVENTION

A primary object of the present invention is to provide an anti-eavesdropping device which will overcome the shortcomings of the prior art devices.

Another object is to provide an anti-eavesdropping device which can be used to produce confidential communications in the presence of eavesdroppers and eavesdropping equipment.

Still another object is to provide an anti-eavesdropping device which operates in such a way that no sound can escape into the environment to be detected in any way, by the human ear or by any kind of eavesdropping equipment utilizing direct or indirect interception of sound waves, such as microphones or vibration detection equipment utilizing laser beams.

An additional object is to provide an anti-eavesdropping device which can be used to protect the hearing of people, and facilitate communication in high noise environments, and over distances such as near jet aircraft, and in military and industrial situations.

A further object is to provide an anti-eavesdropping device which is simple and easy to use.

A still further object is to provide an anti-eavesdropping device which is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
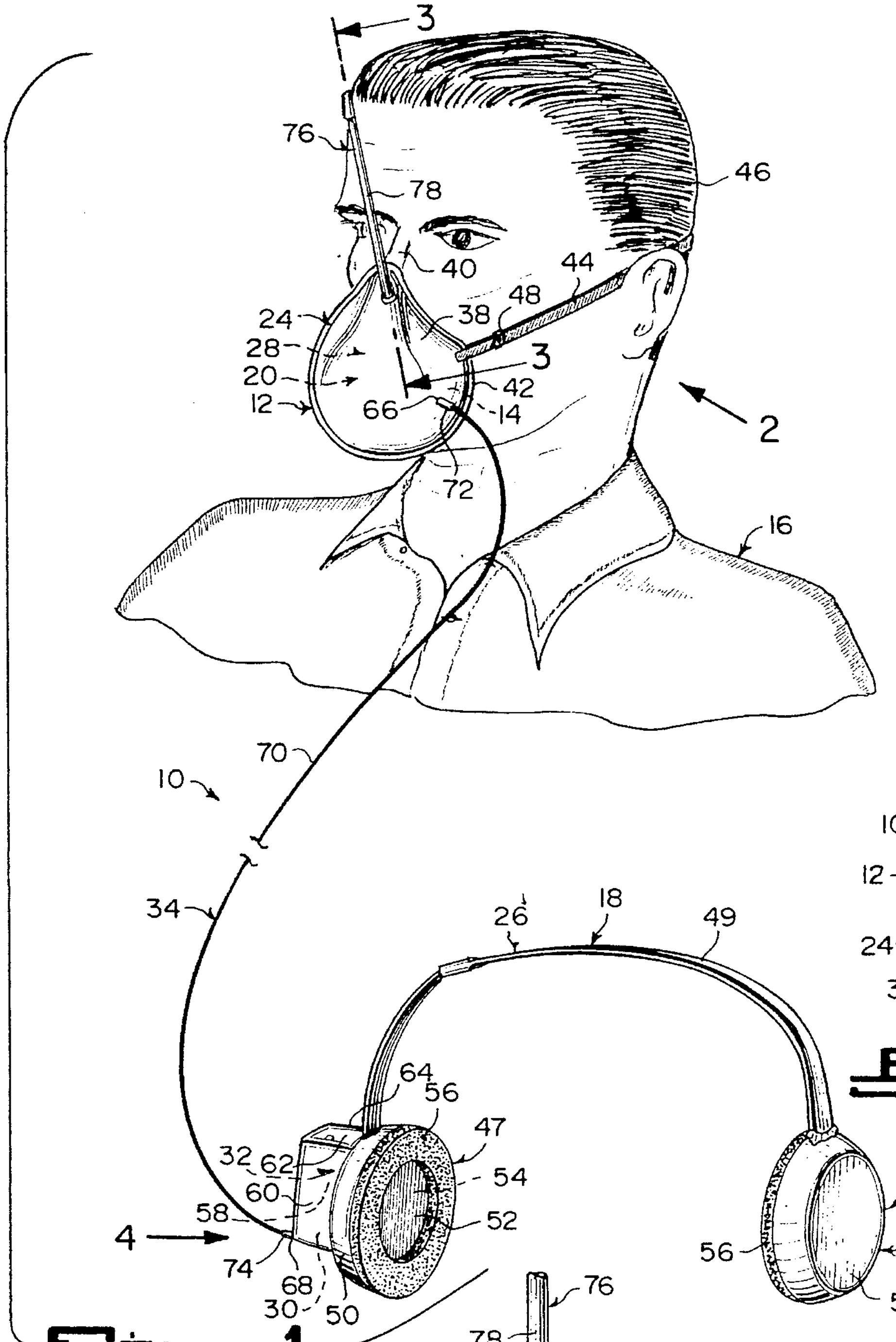
FIG. 1 is a perspective view of the invention showing the face mask worn on a person.

Turning now descriptively to the drawings, in which similar reference characters denote similar elements throughout the several views, FIGS. 1 through 4 illustrates an anti-eavesdropping device 10, which consists of a first structure 12 for containing sound waves emanating from a mouth 14 of a first person 16. A second structure 18 is for containing sound waves entering into the ears of a second person (not shown). A first mechanism 20 in the first containing structure 12 is for converting the sound waves into electric waves. A second mechanism 22 in the second containing structure 18, is for converting the electric waves back into the sound waves, so that the two people can engage in conversation, in which no sound will escape into the environment to be detected in any way.

The first sound containing structure 12 is a face mask 24. The second sound containing structure 18 is a headset 26. The first converting mechanism 20 is a microphone 28.

The second converting mechanism 22 consists of an amplifier 30 that is electrically connected to the headset 26. A power supply 32 is electrically connected to the amplifier 30. A component 34 is for electrically connecting the amplifier 30 to the microphone 28.

The face mask 26 contains a flexible covering 38, to fit over the mouth 14 and nose 40 of the first person 16. A cushion 42 is on a periphery of the flexible covering 38, to form an acoustic seal about the mouth 14 and nose 40. A strap 44 extends from the flexible covering 38, to fit about the head 46 of the first person 16. The strap 44 includes a buckle 48 to make the strap 44 adjustable to fit different sized heads 46.

The headset 26 consists of a pair of headphones 47. An adjustable headband 49 extends between the headphones 47, so that the headphones 47 will be supported against the ears of the second person.

Each headphone 47 includes a housing 50 connected to one end of the adjustable headband 49. A grille 52 is on the housing 50, to face one ear. A small speaker 54 is within the housing 50 behind the grille 52. A cushion 56 is on a periphery of the housing 50 about the grille 52, to form an acoustic seal about the ear.

The power supply 32 is a battery 58. A receptacle 60 is mounted to one housing 50 opposite from the grille 52, to hold the amplifier 30 and the battery 58 therein. A lid 62 is hinged at 64 to the receptacle 60, so that the battery 58 can be removed and replaced when needed.

The electrical connecting component 34 consists of a first jack 66 on the flexible covering 38 of the face mask 24, electrically connected to the microphone 28 therein. A second jack 68 on the receptacle 60 is electrically connected to the amplifier 30 therein. An elongate electrical cord 70 is provided, with a pair of plugs 72, 74 each of which is connected to each end of the elongate electrical cord 70. The plugs 72, 74 can engage with the first jack 66 and the second jack 68.

Figure 3:
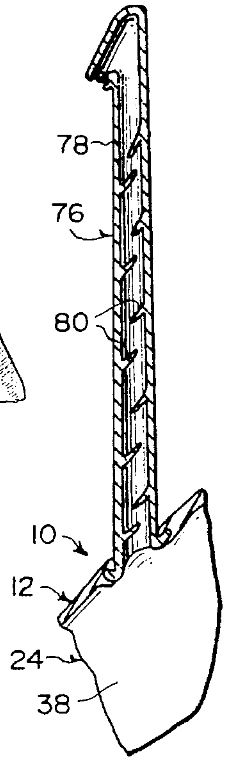
FIG. 3 is an enlarged cross sectional view taken along line 3—3 in FIG. 1.
Figure 2:
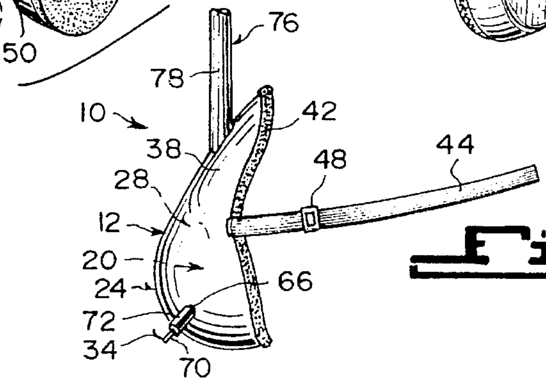
FIG. 2 is a side view taken in direction of arrow 2 in FIG. 1 with parts broken away.
Figure 4:
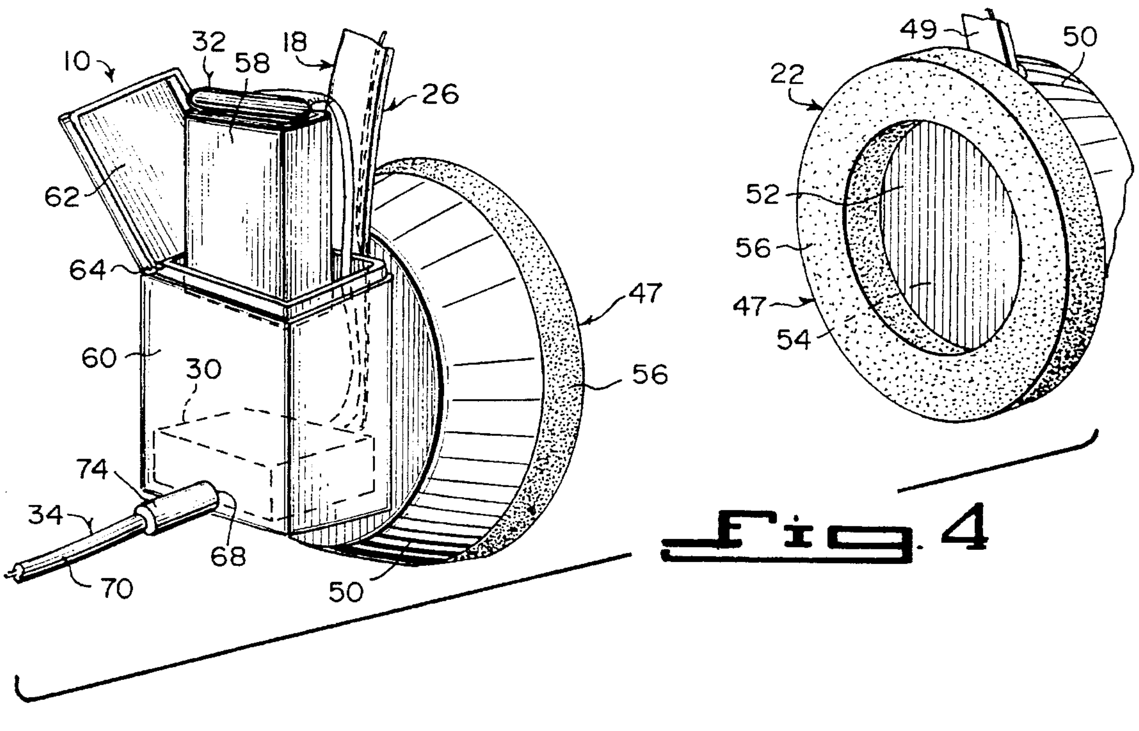
FIG. 4 is an enlarged perspective view taken in direction of arrow 4 in FIG. 1 with parts broken away.

An apparatus 76 is in the flexible covering 38 of the face mask 24, for allowing air to enter for breathing, while preventing sound to leave therefrom. The breathing apparatus 76, as best seen in FIG. 3, is an elongated hollow tube 78 extending upwardly from the flexible covering 38 of the face mask 24, adjacent the nose 40 of the first person 16. The elongated hollow tube 78 has a plurality of staggered baffles 80, some of which extend downwardly while others extend upwardly at an angle therein. The air can enter the hollow tube 78, while the baffles 80 prevent sound from exiting the hollow tube 78.

The device 10 can also contain an on/off volume switch. Other embodiments are also possible, such as the face mask 24 covering only the mouth 14, leaving the nose 40 to breathe naturally. The face mask 24 can also cover the mouth 14, the nose 40, face and head 46 of the first person 16, to contain the sound waves. Earphones can be used instead of headphones 47. A combination microphone-earphone can be utilized to make a version that picks up sound from the ear.

The breathing apparatus 76 described above is the preferred type to be utilized. Other kinds of breathing apparatuses can also be used.

The function of transferring the electronic message from the face mask 24 to the headphones 47 can also be done in other ways, such as by radio transmission for longer distance communications, or by using hollow tubes which conduct sound in place of microphones, speakers and wires.

LIST OF REFERENCE NUMBERS

10 anti-eavesdropping device
12 first sound containing structure
14 mouth of 16
16 first person
18 second sound containing structure
20 first converting mechanism in 12
22 second converting mechanism in 18
24 face mask for 12
26 headset for 18
28 microphone for 20
30 amplifier
32 power supply
34 electrical connecting component
38 flexible covering
40 nose of 16
42 cushion on 38
44 strap on 38
46 head of 16
47 headphone
48 buckle on 44
49 adjustable headband
50 housing
52 grille on 50
54 small speaker in 50
56 cushion on 50
58 battery for 32
60 receptacle
62 lid
64 hinge between 60 and 62
66 first jack on 38
68 second jack on 60
70 elongate electrical cord
72 first plug on 70
74 second plug on 70
76 breathing apparatus in 38
78 elongated hollow tube
80 baffle in 78

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters patent is set forth in the appended claims:

1. An anti-eavesdropping device which comprises:

a) means comprising a face mask for containing sound waves emanating from a mouth of a first person, said face mask comprising a flexible covering to fit over the mouth and nose of the first person, a cushion on a periphery of said flexible covering to form an acoustic seal about the mouth and nose, and a strap extending from said flexible covering to fit about the head of the first person;

b) means comprising a headset for containing sound waves entering into the ears of a second person;

c) means comprising a microphone in said face mask for converting the sound waves into electric waves;

d) means in said headset for converting the electric waves back into the sound waves, so that the two people can engage in conversation, in which no sound will escape into the environment to be detected in any way, comprising an amplifier electrically connected to said headset, a power supply electrically connected to said amplifier, and means for electrically connecting said amplifier to said microphone; and e) breathing means mounted on said face mask to permit breathing by said first person while preventing sound to leave said face mask comprising an elongated hollow tube extending upwardly from said face mask adjacent the nose of said first person, said elongated hollow tube containing a plurality of staggered baffles some of which extend upwardly and some of which extend downwardly so that air can enter said hollow tube while said baffles prevent sound from exiting said hollow tube.

2. An anti-eavesdropping device as recited in claim 1, wherein said strap includes a buckle to make said strap adjustable to fit different sized heads.

3. An anti-eavesdropping device as recited in claim 1, wherein said headset includes:

a) a pair of headphones; and b) an adjustable headband extending between said headphones, so that said headphones will be supported against the ears of the second person.

4. An anti-eavesdropping device as recited in claim 3, wherein each said headphones includes:

a) a housing connected to one end of said adjustable headband;

b) a grille on said housing to face one ear;

c) a small speaker within said housing behind said grille; and d) a cushion on a periphery of said housing about said grille to form an acoustic seal about the ear.

5. An anti-eavesdropping device as recited in claim 4, wherein said power supply is a battery.

6. An anti-eavesdropping device as recited in claim 5, further including:

a) a receptacle mounted to one said housing opposite from said grille to hold said amplifier and said battery therein; and b) a lid hinged to said receptacle, so that said battery can be removed and replaced when needed.

7. An anti-eavesdropping device as recited in claim 6, wherein said electrical connecting means includes:

a) a first jack on said flexible covering of said face mask, electrically connected to said microphone therein;

b) a second jack on said receptacle, electrically connected to said amplifier therein;

c) an elongate electrical cord; and d) a pair of plugs, each connected to each end of said elongate electrical cord, so that said plugs can engage with said first jack and said second jack.

* * * * *